United States Patent
Channey et al.

(10) Patent No.: US 11,716,440 B2
(45) Date of Patent: Aug. 1, 2023

(54) PORTABLE HUB WITH DIGITAL VIDEO RECORDER

(71) Applicant: Harman International Industries, Incorporated, Stamford, CT (US)

(72) Inventors: Royce D. Channey, Ann Arbor, MI (US); Kumar Abhimanyu, Bellevue, WA (US); Prakash Tripathi, Gurgaon (IN); Sandip Ranjhan, Rohini (IN)

(73) Assignee: Harman International Industries, Incorporated, Stamford, CT (US)

( * ) Notice: Subject to any disclaimer, the term of this patent is extended or adjusted under 35 U.S.C. 154(b) by 1053 days.

(21) Appl. No.: 15/722,896

(22) Filed: Oct. 2, 2017

(65) Prior Publication Data

US 2018/0324384 A1 Nov. 8, 2018

(30) Foreign Application Priority Data

May 2, 2017 (IN) .............................. 201741015448

(51) Int. Cl.
*H04N 5/775* (2006.01)
*H04N 5/38* (2006.01)
(Continued)

(52) U.S. Cl.
CPC ............ *H04N 5/7755* (2013.01); *H04N 5/38* (2013.01); *H04N 5/64* (2013.01); *H04N 5/765* (2013.01);
(Continued)

(58) Field of Classification Search
CPC .... H04N 21/2343; H04N 5/38; H04N 5/4403; H04N 21/40; H04N 21/43615;
(Continued)

(56) References Cited

U.S. PATENT DOCUMENTS

| 9,554,061 B1 | 1/2017 | Proctor, Jr. et al. |
| 2004/0117440 A1 | 6/2004 | Singer et al. |

(Continued)

FOREIGN PATENT DOCUMENTS

| CN | 205265896 U | 5/2016 |
| CN | 205545756 U | 8/2016 |

(Continued)

OTHER PUBLICATIONS

Cunningham, iCreation SpeeCup review: Unwieldy speaker streams music, calls, CNET, 5 pages, Aug. 22, 2013 at https://www.cnet.com/reviews/icreation-speecup-review/ (Year: 2013).*

(Continued)

*Primary Examiner* — Hung Q Dang
(74) *Attorney, Agent, or Firm* — Brooks Kushman, P.C.

(57) ABSTRACT

A portable media content device for providing media content to remote devices external to a home network, the portable media content device may include a processor in communication with a memory configured to maintain media content, and a transceiver. The processor may be configured to recognize a home network provided at a first location, instruct the transceiver to transmit a media request to an in-home media recorder connected to the home network and at the first location, receive, in response to the media request, media content from the media recorder and to store the media content in the memory.

7 Claims, 3 Drawing Sheets

(51) Int. Cl.
*H04N 5/64* (2006.01)
*H04N 5/765* (2006.01)
*H04N 21/422* (2011.01)
*H04N 21/433* (2011.01)
*H04N 21/436* (2011.01)
*H04N 21/442* (2011.01)
*H04N 21/45* (2011.01)
*H04L 67/025* (2022.01)
*H04N 21/4363* (2011.01)
*H04L 12/28* (2006.01)
*H04N 21/4227* (2011.01)

(52) U.S. Cl.
CPC ... *H04N 21/42204* (2013.01); *H04N 21/4334* (2013.01); *H04N 21/43615* (2013.01); *H04N 21/44227* (2013.01); *H04N 21/4508* (2013.01); *H04N 21/4227* (2013.01)

(58) Field of Classification Search
CPC ............ H04N 21/6338; H04N 21/6371; H04L 21/2812; H04L 67/28; H04L 67/32; H04L 65/607; B60N 3/105; B60N 3/101; B60R 11/00
USPC ......... 224/545; 248/311.2; 725/80, 100, 117, 725/120, 131; 709/231; 386/291–299
See application file for complete search history.

(56) References Cited

U.S. PATENT DOCUMENTS

| | | |
|---|---|---|
| 2007/0135038 A1 | 6/2007 | Peele |
| 2007/0136778 A1* | 6/2007 | Birger ................. G11B 19/025 725/117 |
| 2007/0283046 A1 | 12/2007 | Dietrich et al. |
| 2009/0319599 A1 | 12/2009 | Gaunter et al. |
| 2010/0077094 A1* | 3/2010 | Howarter ................ H04L 67/12 709/231 |
| 2011/0032666 A1* | 2/2011 | Gideonse ............ G06F 3/03547 361/679.01 |
| 2012/0138650 A1* | 6/2012 | Wilms ................... B60R 11/02 224/545 |
| 2012/0271904 A1* | 10/2012 | Black ................... H04L 67/289 709/213 |
| 2014/0269523 A1 | 9/2014 | Wu et al. |
| 2015/0149599 A1* | 5/2015 | Gaunter .............. H04L 12/2812 709/219 |
| 2015/0314718 A1* | 11/2015 | Ghyvoronsky ........ B60N 3/106 296/37.8 |
| 2017/0091251 A1* | 3/2017 | Wood ...................... G06F 16/23 |
| 2018/0255437 A1* | 9/2018 | Robbins ................. H04W 4/08 |

FOREIGN PATENT DOCUMENTS

| | | |
|---|---|---|
| CN | 205958954 U | 2/2017 |
| WO | 2012047026 A2 | 4/2012 |
| WO | 2016019397 A2 | 2/2016 |
| WO | 2016033400 A1 | 3/2016 |

OTHER PUBLICATIONS

"Digital Video Broadcasting (DVB); Content 1-15 Protection and Copy Management (DVB-CPCM); Part 3: CPCM Usage State Information", Technical Specification, European Telecommunications Standards Institute (ETSI), 650, Route Des Lucioles; F-06921 Sophia-Antipolis; France, vol. BROADCAS, No. V1,2.1, Mar. 1, 2011 (Mar. 1, 2011), 28 pages.

Jianshen Zhang China Cable Television Networks China: "Output—Draft new Recommendation ITU-T J. lasdp-req Functional and Application Programming Interface Requirements for Local Application and Service Delivery Platform for Cable Home Networkds (Jan. 21-28, 2016, Geneva); TD 871 (GEN/9)", ITU-T Draft; Study Period 2013-2016, International Tfi Fcommunication Union, Geneva; CH, vol. 9/9, Jan. 26, 2016 (Jan. 26, 2016), 32 pages.

* cited by examiner

PORTABLE HUB WITH DIGITAL VIDEO RECORDER

CROSS-REFERENCE TO RELATED APPLICATIONS

This application claims priority to Indian Patent Application No. 201741015448 filed May 2, 2017, the disclosure of which is hereby incorporated in its entirety by reference herein.

TECHNICAL FIELD

Embodiments disclosed herein generally relate to portable hubs and/or digital video recorders.

SUMMARY

A portable media hub for wireless transmission of media content may include a speaker, a memory and a transceiver. The hub may include a processor configured to recognize a first network provided at a first location, instruct the transceiver to transmit a media request to an in-home media recorder, and receive media content from the media recorder in response to the media request and save content in the memory. The processor may also recognize a remote device by receiving a content request for media content via a second network from the remote device, the second network being distinct and separate from the first network and not available at the first location, determine whether the remote device has permission to access media content stored in the memory, and transmit the media content in response to the remote device having permission to access the media content.

A portable media content device for providing media content to remote devices external to a home network, the portably media content device may include a cylindrical body configured to be received by a vehicle beverage holder. The body may include at least one speaker configured to reproduce audio sounds, a memory configured to maintain media content, a rechargeable battery, a wireless transceiver configured to communicate wirelessly with a remote device, and at least one user interface configured to receive user commands. The body may also include a processor configured to receive media content request and instruct the wireless transceiver to provide media content to the remote device in response to the media content request.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a media system having a portable and/or digital video recorder device configured to provide media content typically provided by a service provider at a specific location such as a home or residence, to users associated with the residence. The media gateway device may permit such services, such as internet access and digital video recording (DVR) features, to be enjoyed by users in cellular connected automobiles. Content may be curated and stored locally on the media device for later access. This may reduce communication data consumption, such as long-term evaluation (LTE) consumption, as well as provide for higher quality playback of the media content. The media device may provide a seamless experience to the user whether the user is at home, or traveling, by allowing the user to enjoy content provided by the service provider, regardless of his or her location. By allowing content typically provided by a DVR, the media device allows a seamless experience even away from the home.

The media device may also be an intelligent software based agent that does intelligent routing of user traffic access via a wireless hotspot. The wireless hotspot may allow the user to access the cellular (e.g., LTE, 5G) networks. The media device may handle LTE to WiFi handoffs and serve a dual purpose of acting as an access point as well as acting in STA (station computer) mode when communicated with the LTE service provider. Thus, mobile devices may connect to a wireless network such as a cellular network, in-vehicle network, etc., and may stream content to their mobile devices via the wireless network.

The media device provides for a bring your own device (BYOD) experience and eliminates the need for sharing of any Wi-Fi password, as well as allows a vehicle owner to directly control which devices connect and access the wireless network.

The digital video recorder device may be portable and configured to fit within a cup holder of a vehicle, boat, etc. The device may include a status indicator and user interface to allow a user to easily interact with the device.

Figure 1:
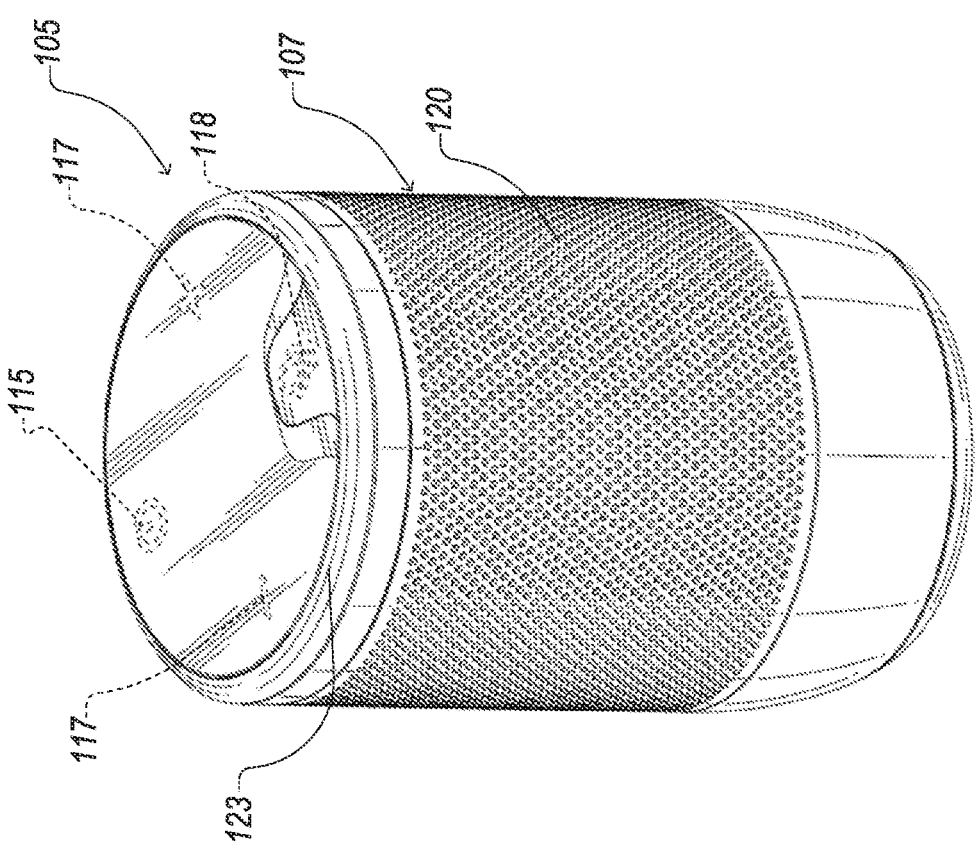
FIG. 1 illustrates a front view of a media device in accordance with one embodiment.

FIG. 1 illustrates perspective front view of an example media device 105 in accordance with one embodiment. The media device 105 may be a media storage device configured to be portable and rechargeable. The media device 105 may form a cylindrical body 107 configured to fit within a cup or beverage holder of a vehicle. The media device may act as a portable speaker, storage device, and hot-spot. In one example, the media device 105 may have an approximate diameter of 78 mm, and approximate height of 117 mm, and may weigh 115 g.

The media device 105 may include an interface 110 which may include various depressible buttons or switches. The buttons may be used by a user to control various functions of the media device 105. The interface 110 may include a power button 115, volume buttons 117, and a voice assistant button 118.

The power button 115 may turn on the media device 105 and allow the media device 105 to be operated by the user. The volume buttons 117 may increase or decrease the volume. The voice assistant button 118 may cause the media device 105 to enable a virtual assistant. The virtual assistant may be configured to receive audio commands received at a microphone within the media device 105 (not shown) from a user. In response to these commands, the media device 105 may activate certain features, respond to the commands, etc. For example, a user may speak the phrase "play Sign of the Times." The media device 105 may then begin playback of that specific song. As explained herein, the playback may be at the media device 105, but may also be at various other playback devices including mobile devices, vehicle speakers, etc. The voice based commands may also include requests for weather information, current temperature, current locations., etc. Such voice based commands may provide for control of the media hub and device associated with the media hub. More or less buttons may be included. The buttons may be configurable by the user. The buttons may also include a parental control button.

The media device 105 may include a speaker 120 configured to playback media content therefrom. The speaker 120 may form the cylindrical body 107 of the media device 105. The media content may be provided by a service provider such as a cable company or other media provider and may include audio and visual content such as movies, shows, commercials, live events such as sporting events and news, audio only content such as music and podcast, etc.

The media device 105 may also include a status indicator 123. The status indicator 123 may be arranged around an upper circumference of the body 107. The status indicator 123 may include a lens and light emitting diodes (LEDs) arranged therein capable of illuminating the status indicator 123 in any number of colors. The colors may indicate a status of the media device 105. For example, upon power-on, the status indicator 123 may illuminate blue. During playback, the status indicator 123 may illuminate green, and so on. Additionally or alternatively, the status indicator 123 may include light pipes, as well as other light emitting devices in order to alter the color of the status indicator 123. The status indicator 123 may be configured, via the lens, to display an opaque appearance when the media device 105 is off.

Although not shown, the media device 105 may include a power supply (not shown), either an external power supply (e.g., AC power source or DC power source) or internal supply (e.g., battery), as well as other inputs (not shown) such as an auxiliary port, universal serial port (USB) port, micro USB, DC jack, etc. The battery may be a rechargeable 4400 mAh battery and the external power supply may include a vehicle power supply (e.g., vehicle battery) with in-vehicle connections.

The media device 105 may also include other input ports such as micro and nano sim card ports. These additional ports may permit additional storage space for the media device 105. The media device 105 may also be capable of near field communication (NFC) whereby the media device 105 may communicate with area devices to transfer information related to payments, credit cards, etc. The NFC may also allow sharing of contacts, photos, videos, etc., among the media device 105 and surrounding devices.

The media device 105 may also include other components such as a gyroscope, global positioning system (GPS), accelerometer, thermometer, etc. These components may provide data to the media device 105 and the media device 105 may use such data to make certain determinations, apply certain settings, etc.

Figure 2:
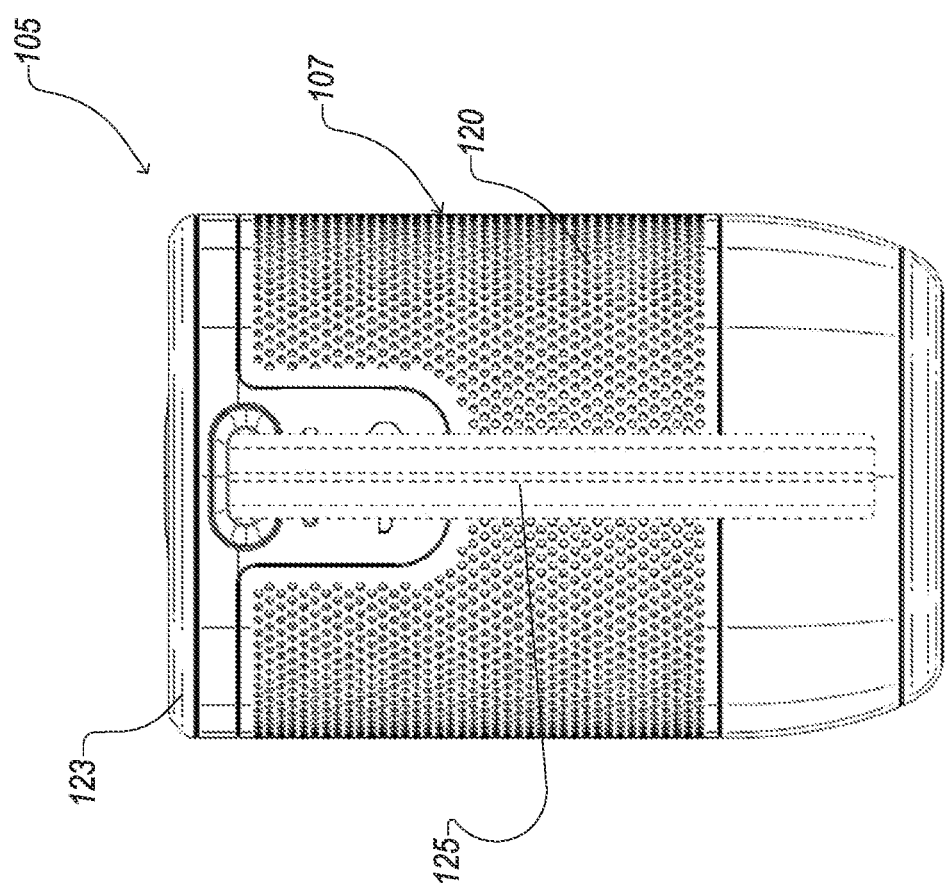
FIG. 2 illustrates a rear view of the media device of FIG. 1.

FIG. 2 illustrates perspective rear view of the example media device 105 in accordance with one embodiment. The media device 105 may include a strap 125. The strap 125 may attach to the cylindrical body 107 via a grommet 127. The strap 125 may be any material such as leather, cloth, vinyl, etc. The strap 125 may enable a user to easily carry the media device 105 from location to location.

Figure 3:
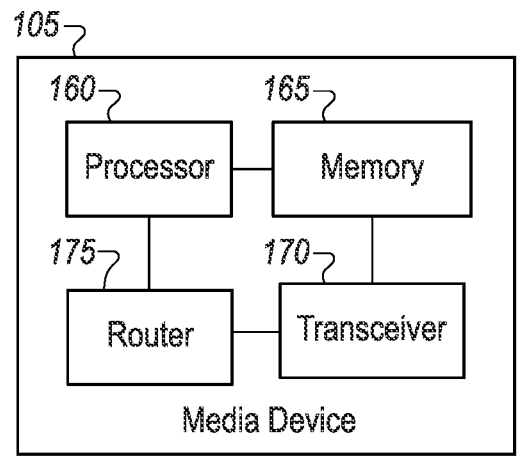
FIG. 3 illustrates a block diagram of the media device.

FIG. 3 illustrates a block diagram of the example media device 105 in accordance with on embodiment. The media device 105 may include a processor 160 and a memory 165 to process commands received at the interface 110 as well as commands received wirelessly from other devices. The processor 160 may be one or more computing devices capable such as a quad core processor for processing commands such as a computer processor, microprocessor, or any other device, series of devices or other mechanisms capable of performing the operations discussed herein. The memory 165 may store instructions and commands. The instructions may be in the form of software, firmware, computer code, or some combination thereof, and when executed by the processor 160, may provide the functionality of the media device 105 as described herein. The memory 165 may be in any form of one or more data storage devices, such as volatile memory, non-volatile memory, electronic memory, magnetic memory, optical memory, or any other form of data storage device. In one example, the memory may include 2GB DDR3, as well as other removable memory components such as a 128 GB micro SD card.

The memory 165 may also include digital rights management (DRM) that enables secure distribution of media content. In addition to instructions, the memory 165 may store media content, such as video and/or audio files. Such media content may be stored in the memory 165 of the media device 105 in order to playback media content at the media device 105 (e.g., audio content) via the speaker 120. The media content stored in the memory 165 may also be transmitted to other devices for playback thereon. For example, a movie may be stored in the memory 165 and transmitted to a mobile device such as a tablet computer for playback. The memory 165 may maintain a listing of media content stored therein.

The memory 165 may also maintain a listing of permissions or access settings for permitting remote devices 173 to receive content from the memory 165. In other words, the memory 165 may maintain a listing of authorized devices or authorized users.

The media device 105 may include a wireless transceiver 170. The wireless transceiver 170 may be one or more antennas capable of receiving/transmitting signals, commands, data and content from remote devices. The transceiver 170 may receive commands as well as transmit and provide the media content to other devices. As explained, such wireless communications may include LTE, Bluetooth, WiFi, ZigBee, etc.

In addition to the transceiver 170, or in alternative to the transceiver, the media device 105 may include, a wireless router 175 configured to provide a wireless hotspot to devices surrounding the media device 105. The wireless router 175 may allow the media device 105 to connect to a cellular LTE or wireless network such as WiFi, Bluetooth, and ZigBee, and create a data connection with various devices, thus enabling Wi-Fi enabled gadgets to connect to a wireless network. The media device 105 may serve as a mobile router in some instances, allowing devices that may not be associated with a wireless network to connect to one associated with a home, phone, or other mobile device.

Figure 4:
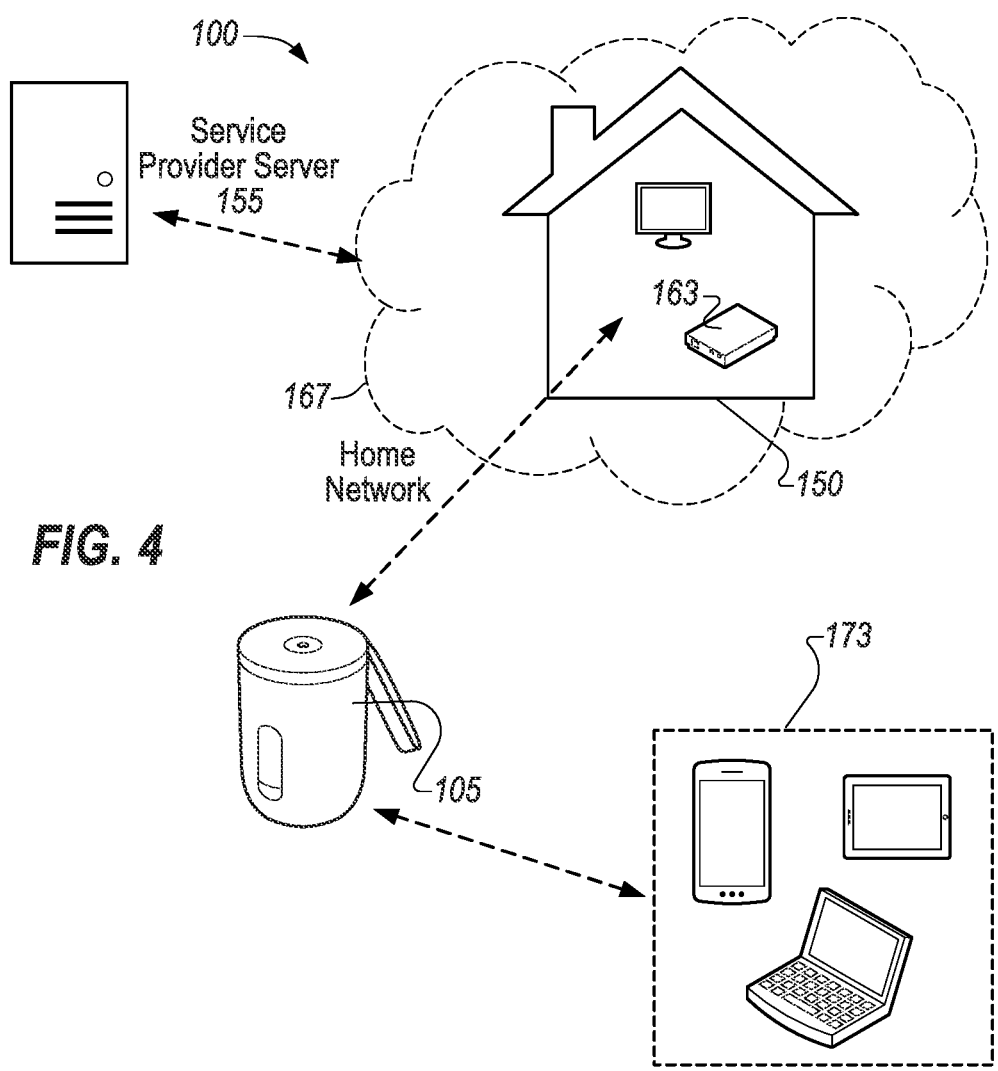
FIG. 4 illustrates a media system in accordance with one embodiment.

FIG. 4 illustrates an example media system 100 for the media device 105 including a first location 150. The first location 150 may be a user's home, such as a house or apartment. The first location 150 may also be an office building, a business location, or other location associated with a specific address. The first location 150 may be associated with a content subscription such as cable television, or other content based subscription. A service provider server 155 may be associated with the subscriptions and may provide certain services to the first location 150. For example, the service provider server 155 may provide one or more of cable, internet, and phone services to the first location 150. The services may be provided via several methods including but not limited to physical connections such as fiber optic cables and trunk cables, satellite services including antennas, and other wireless providers. In the examples discussed herein, the service provider server 155 may provide the first location 150 with a home wireless network 167 that provides WiFi, or other wireless capabilities, to the first location 150, as well as a cable service that provides media content to the first location 150.

The service provider server 155 may communicate with a receiver, or in-home media recorder 163, at the first location 150 to provide content and services to that location. The receiver may be a cable box or other form of hardware configured to provide a connection, either wired or wireless, to the service provider server 155. In the example shown in FIG. 4, the receiver may be a digital video recorder (DVR) 163. As explained, the service provider may provide cable TV services to the first location 150. The service provider server 155 may also provide content and service to the media device 105. The content may involve cable television shows. Recordings of the media content may be selectably stored on the recorder 163.

The service provider server 155 may maintain a subscription account associated with a certain location such as the first location 150. Although service is associated with the first location 150, users may wish to enjoy benefits of the subscription outside of the first location 150. For example, users may wish to enjoy DVR features while away from the first location 150. Typically, in order to do this, a user may be required to log-in to a web or app-based system via a device such as a laptop, tablet computer, etc., to access the content. This may not always be possible when traveling or when wireless networks are unavailable or unreliable. Furthermore, the requirement of logging in may not be convenient. The media device 105 may, as explained, be portable and may be configured to provide services similar to those received at the first location 150, at various other locations. In one example, the media device 105 may store media content locally and allow other devices to access the media content. In another example, the media device 105 may function as a hotspot to permit other devices to connect to a wireless network while in the car, at a beach, etc.

The media device 105 may recognize when the media device 105 is at the first location 150 as well as when the media device is not at the first location 150. For example, the media device 105 may, via the wireless transceiver, recognize the service provided by the service provider by recognizing a wireless network provided by the service provider. The wireless network may have a unique identifier associated therewith and upon detection of the specific wireless network at the first location, the media device 105 may recognize the location. Thus, when the media device 105 is at or near the first location 150, the media device 105 may recognize the first location 150 as its home, or primary location via the residential WiFi.

The media device 105 may also include a GPS module (not shown) and may be configured to form a geofence around the first location 150. In this example, whenever the media device 105 enters the geofence, the media device 105 may recognize the first location 150. Conversely, the media device 105 may recognize when the media device 105 leave the geofenced area.

Upon recognizing the first location, the media device 105 may sync with the residential WiFi. In doing this, the media device 105 may query the recorder 163. The query may include a request for all media content currently stored within the recorder 163. The query may also include a request for all media content currently stored within the recorder 163 and having been stored since the last query. That is, the query may include a request for all 'new' or recently stored media content.

In response to the query, the media device 105 may store any media content currently stored within the recorder 163, but not yet stored on the media device 105. This may include content that was recently recorded at the recorder 163 at the first location while the media device 105 was not located at the first location 150. In one example, the media device 105 may be at a second location (not specifically shown) distinct from the first location. For example, the user may have traveled away from the first location, taking the portable media device 105 with he or she for an extended period of time. During the time away from the first location 150, the recorder 163 may have recorded certain scheduled television shows. Upon returning to the first location 150 after the extended time away, the media device 105 may query the recorder 163 to determine what content was downloaded during its absence from the first location 150. The media device 105 may then begin to store the new content in the memory 165.

In addition to storing newly recorded content, the media device 105 may also remove recently deleted content from the memory 165. That is, the query may also include a request for recently removed content at the recorder 163. In the example above, while the user was away from the home, certain older shows may have been deleted from the recorder 163. Thus, upon returning home, such content may also be removed from the media device 105.

The media device 105 may connect with various mobile devices 173. These mobile devices may include phones, tablets, or personal computers (PC), etc. The mobile devices 173 may connect with the media device 105 via a wireless network and may receive content from the media device 105. The mobile devices 173 may also use the wireless router 175 of the media device 105 to access services facilitated by a wireless network including the internet, streaming media content, etc. The media devices 105 may access the content from the media device 105 without needed to first download and application or other client typically required for certain service providers. Once one of the mobile devices 173 has created a connection with the media device 105, the mobile device 173 may stream content from the media device 105. Thus, even when not at the first location 150, a user may enjoy the services provided by the service provider server 155.

A primary user, such as an adult or parent, may manage and control access to the media device 105. Such control may allow the primary user to grant access to other users, such as vehicle passengers and children, as well as limit access for individuals. Once access is granted, over the top (OTT) content streaming may be enjoyed by those individuals. As explained, separate clients, such as applications, are not necessary to gain access the content and wireless network provided by the media device 105. Individuals with their personal devices may enjoy the content stored locally on the media device 105. Such bring your own device (BYOD) capabilities make the media device 105 user friendly, and less cumbersome for the primary user to manage separate devices. Guests traveling in a vehicle with the primary user may enjoy the media device capabilities without undue front-end set up.

In addition to interfacing with various user devices, the media device 205 may also interface with a vehicle and various vehicle systems. The media device 105 may secure Wi-Fi access to CAN buss data of the vehicle. This connection may facilitate vehicle stereo control. Thus, the media device 105 may control audio or video playback within the vehicle. The media device 105 may also access vehicle data via the Wi-Fi.

Further, when the media device 105 is located at the first location 130 (e.g., is at the user's home, likely stored in a vehicle parked at the user's home,) the media device 105 may sync with other devices within the home, such as the recorder 163.

Figure 5:
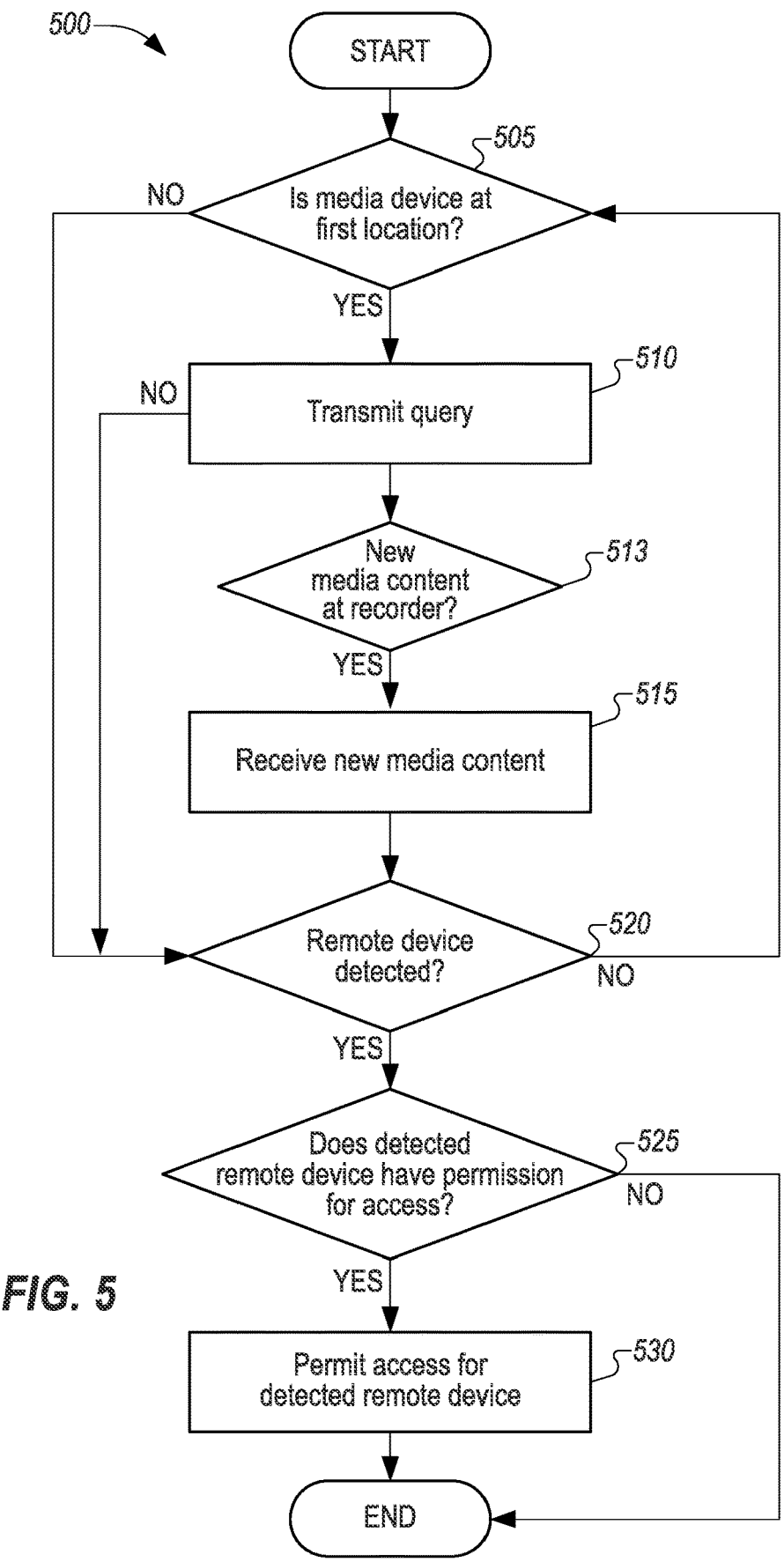
FIG. 5 illustrates an example flow diagram of the media system.

FIG. 5 illustrates an example process 500 of the media system 100. The process 500 may begin at block 505 where the processor 160 of the media device 105 may determine whether the home network 167 provided by the service provider is recognized by the media device 105. That is, is the media device 105 at the first location 150. If so, the process 500 proceeds to block 510. If not, the process 500 proceeds to block 520.

At block 510, upon detecting the home network 167, the processor 160 may query the recorder 163. The query may be transmitted by the transceiver 179 and received by the recorder 163 via the home network 167 and may include a media request. The media request may include a request for new content stored on the recorder 163. The query may include a request for all new media content stored on the recorder 163, but not yet stored in the memory 165 of the media device 105.

At block 513, the processor 160 may determine whether the recorder 163 includes media content that is not currently stored in the memory 165 of the media device 105. That is, has additional media content been downloaded to the recorder 163 since the recorders last synchronization with the media device 105. If so, the process 500 proceeds to block 515, if not the process proceeds to block 520.

At block 515, the media device 105 may receive the new media content and store the new media content within the memory 165.

At block 520, the processor 160 may determine whether one or more of the remote devices 173 is detected. As explained, this may occur when the media device 105 is outside of the home network 167 and not located at the first location 150. The remote device 173 may be detected upon the processor 160 receiving a content request from the remote device 173. The content request may include a request for access to the media device 105. The content request may request a specific media content, such a specific song or show. The content request may include a request to access a list of content stored within the memory 165 of the media device 105. If a mobile device 173 is detected, the process 500 proceeds to block 525. If not, the process 500 proceeds to block 505.

At block 525, the processor 160 may determine whether the detected mobile device has permission to access the media device 105, or access media content stored on the media device 105. As explained above, these permissions may be managed by the primary user. If the mobile device 173 has permission for access, the process 500 proceeds to block 530. If not, the process 500 ends.

At block 530, the processor 160 may permit access to the media device 105, including the media content thereon and/or access to the wireless network provided by the router 175.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller or processor as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A portable media content device for providing media content to remote devices external to a home network, the portably media content device, comprising:
    a processor in communication with a memory configured to maintain media content, and a transceiver, the processor configured to:
        recognize a home network provided at a first location;
        instruct the transceiver to transmit a media request to an in-home media recorder connected to the home network and at the first location;
        determine, in response to the media request, whether the media recorder includes media content not stored within the memory;
        receive the media content from the media recorder in response to the media recorder including media content not stored within the memory;
        store the media content in the memory;
        recognize a remote device by receiving a content request for media content via a second network from the remote device, the second network being distinct and separate from the home network and not available at the first location;
        determine whether the remote device has permission to access media content stored in the memory; and
        transmit the media content in response to the remote device having permission to access the media content.

2. The portable media content device of claim 1, wherein the content request includes a request to access a listing of content stored within the memory.

3. The portable media content device of claim 1, wherein the content request includes a request for specific media content stored within the memory.

4. The portable media content device of claim 1, wherein the media recorder is not in communication with the second network.

5. A portable media hub for wireless transmission of media content, comprising:
    a speaker;
    a memory;
    a transceiver;
    a processor configured to:
        recognize a first network provided at a first location;
        instruct the transceiver to transmit a media request to an in-home media recorder;
        determine, in response to the media request, whether the in-home media recorder includes media content not stored within the memory;
        receive the media content from the media recorder in response to the in- home media recording including media content not stored within the memory;
        recognize a remote device by receiving a content request for media content via a second network from the remote device, the second network being distinct and separate from the first network and not available at the first location;
        determine whether the remote device has permission to access media content stored in the memory; and
        transmit the media content in response to the remote device having permission to access the media content.

6. The portable media hub of claim 5, wherein the content request includes a request to access a listing of content stored within the memory.

7. The portable media hub of claim 5, wherein the content request includes a request for specific media content stored within the memory.

* * * * *